(12) United States Patent
Nawa et al.

(10) Patent No.: US 11,462,103 B2
(45) Date of Patent: Oct. 4, 2022

(54) DRIVER-ASSISTANCE DEVICE, DRIVER-ASSISTANCE SYSTEM, AND DRIVER-ASSISTANCE PROGRAM

(71) Applicant: TOYOTA JIDOSHA KABUSHIKI KAISHA, Toyota (JP)

(72) Inventors: Kazunari Nawa, Yokohama (JP); Toshiyuki Hagiya, Shiki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 17/064,734

(22) Filed: Oct. 7, 2020

(65) Prior Publication Data
US 2021/0192946 A1 Jun. 24, 2021

(30) Foreign Application Priority Data
Dec. 19, 2019 (JP) .............................. JP2019-229745

(51) Int. Cl.
*G08G 1/09* (2006.01)
*G08G 1/00* (2006.01)
*B60W 30/18* (2012.01)
*B60W 40/08* (2012.01)
*G01C 21/34* (2006.01)

(52) U.S. Cl.
CPC ......... *G08G 1/09* (2013.01); *B60W 30/18009* (2013.01); *B60W 40/08* (2013.01); *G01C 21/3407* (2013.01); *G08G 1/22* (2013.01); *B60W 2540/21* (2020.02); *B60W 2556/65* (2020.02)

(58) Field of Classification Search
None
See application file for complete search history.

(56) References Cited

U.S. PATENT DOCUMENTS

2015/0228195 A1\* 8/2015 Beaurepaire ......... G08G 1/0962
340/907
2021/0034889 A1\* 2/2021 Subramanian ............ G06T 7/20

FOREIGN PATENT DOCUMENTS

| CN | 108352112 A | 7/2018 |
|----|-------------|--------|
| CN | 110059333 A | 7/2019 |
| JP | 2015-091058 A | 5/2015 |

\* cited by examiner

*Primary Examiner* — Thomas S McCormack
(74) *Attorney, Agent, or Firm* — Oblon, McClelland, Maier & Neustadt, L.L.P.

(57) ABSTRACT

A driver-assistance device includes a processor having hardware, in which the processor estimates intention related to a drive of a vehicle provided with the processor from input voice data; generates first intention information based on the estimation; transmits the first intention information to outside; and generates and outputs assistance information, which is for assisting the drive of the vehicle provided with the processor based on the first intention information estimated by the processor and second intention information which is intention related to a drive of another vehicle that receives the first intention information transmitted to the outside, the second intention information being estimated by another processor provided in the another vehicle.

17 Claims, 13 Drawing Sheets

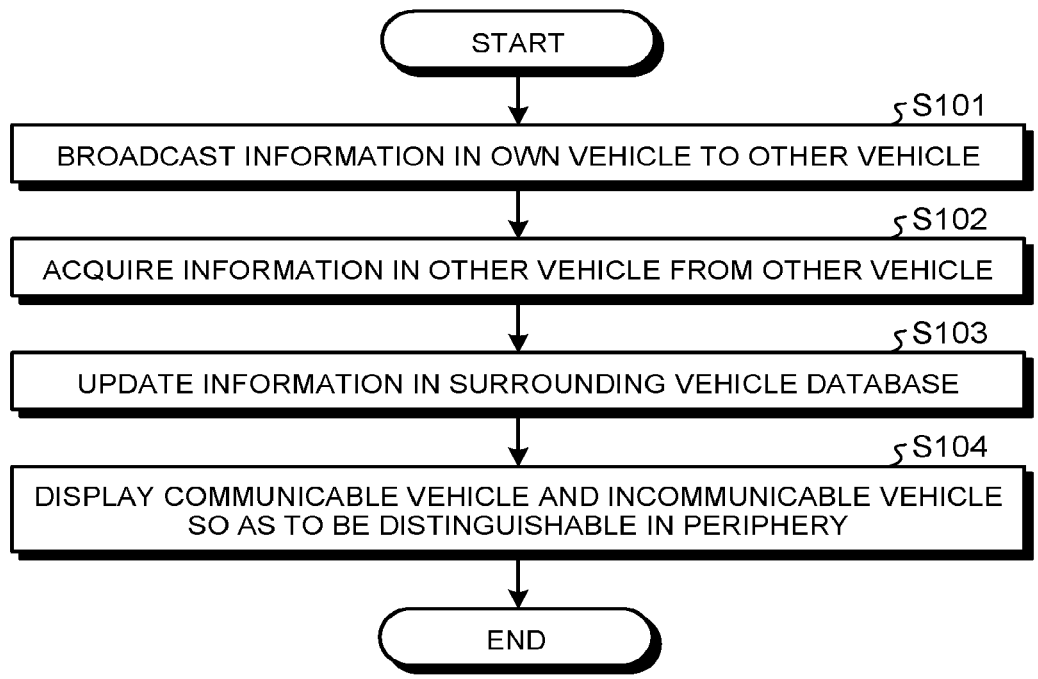
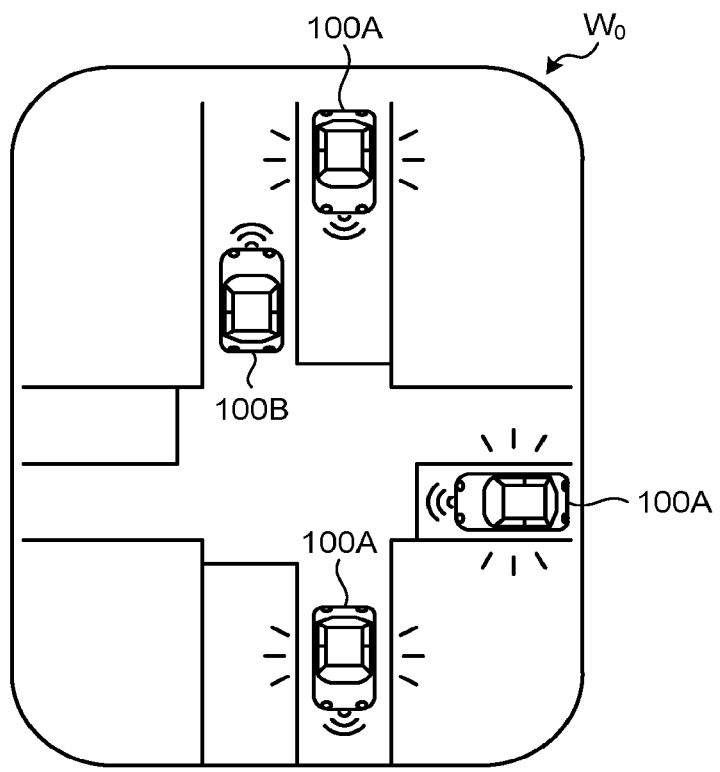

DRIVER-ASSISTANCE DEVICE, DRIVER-ASSISTANCE SYSTEM, AND DRIVER-ASSISTANCE PROGRAM

CROSS-REFERENCE TO RELATED APPLICATION(S)

The present application claims priority to and incorporates by reference the entire contents of Japanese Patent Application No. 2019-229745 filed in Japan on Dec. 19, 2019.

BACKGROUND

The present disclosure relates to a driver-assistance device, a driver-assistance system, and a recording medium.

There is known a technique for assisting driving by a driver of a vehicle, which transmits driver's intention information to another vehicle and drives according to the intention while conveying the intention (see, for example, Japanese Laid-open Patent Publication No. 2015-091058).

SUMMARY

There is a need for providing a driver-assistance device, a driver-assistance system, a driver-assistance program, and a recording medium that can appropriately assist actions to be taken by drivers on both the intention transmitting side and the receiving side.

According to an embodiment, a driver-assistance device includes a processor having hardware, in which the processor estimates intention related to a drive of a vehicle provided with the processor from input voice data; generates first intention information based on the estimation; transmits the first intention information to outside; and generates and outputs assistance information, which is for assisting the drive of the vehicle provided with the processor based on the first intention information estimated by the processor and second intention information which is intention related to a drive of another vehicle that receives the first intention information transmitted to the outside, the second intention information being estimated by another processor provided in the another vehicle.

According to an embodiment, a driver-assistance system includes: a first device including a first processor having hardware; and a second device including a second processor having hardware. Further, the first processor estimates an intention, which is related to a drive of a first vehicle provided with the first device, based on input voice data; transmits request information, which is generated based on the estimated intention, to the second device; and generates and outputs first assistance information, which is for assisting a drive of the first vehicle based on the request information and information related to intention estimated in the second device and acquired from the second device, and the second processor outputs the request information acquired from the first device; estimates intention relative to the request information based on voice data input in response to the request information; and generates and outputs second assistance information, which is for assisting drive of a second vehicle provided with the second device, based on the intention estimated in the second device and the request information.

According to an embodiment, a non-transitory computer readable recording medium stores driver-assistance program which causes a processor having hardware to: estimate intention related to a drive of a vehicle provided with the processor from input voice data; transmit first intention information generated by estimation to outside; and generate and output assistance information, which is for assisting the drive of the vehicle provided with the processor and is based on the first intention information estimated by the processor and second intention information, which refers to intention related to a drive of another vehicle that receives the first intention information transmitted to the outside, the second intention information being estimated by another processor provided in the another vehicle.

BRIEF DESCRIPTION OF THE DRAWINGS

FIG. 3 is a diagram illustrating a flow of building surrounding vehicle information in the driver-assistance system according to the embodiment of the present disclosure;

FIG. 4 is a diagram illustrating an example of a display screen displayed in a vehicle of the driver-assistance system according to the embodiment of the present disclosure;

DETAILED DESCRIPTION OF THE PREFERRED EMBODIMENTS

In the related art, a technique disclosed in, for example, Japanese Laid-open Patent Publication No. 2015-091058 may not be able to assist driving that reflects the intention of the driver on the receiving side.

Hereinafter, one embodiment of the present disclosure will be described with reference to the accompanying drawings. Note that the same or corresponding parts are denoted by the same reference symbols in all the drawings of the following embodiment. Moreover, the present disclosure is not limited by the embodiment described below.

Embodiment

Figure 1:
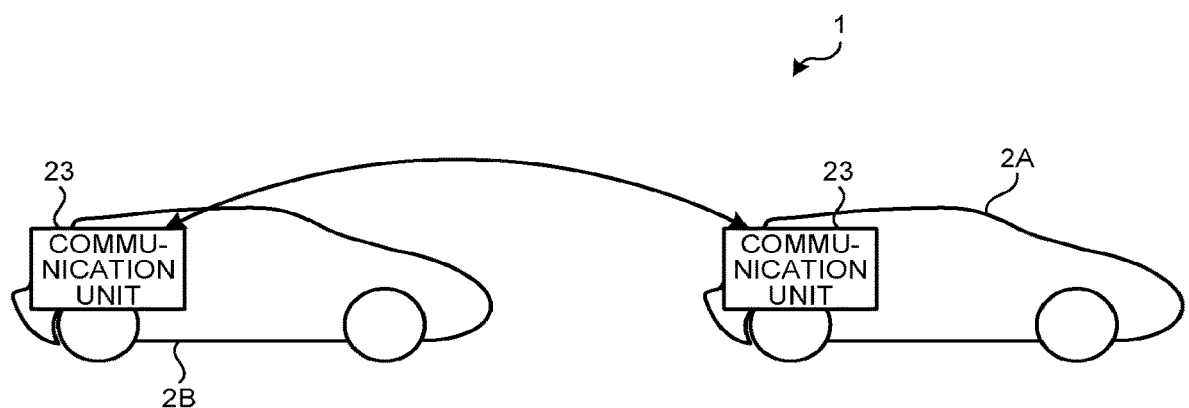
FIG. 1 is a schematic diagram illustrating a driver-assistance system including a driver-assistance device according to one embodiment of the present disclosure.

First, a vehicle voice recognition system including a voice recognition device according to the embodiment of the present disclosure will be described. FIG. 1 is a schematic diagram illustrating a driver-assistance system including a driver-assistance device according to the embodiment of the present disclosure.

A driver-assistance system 1 includes a plurality of vehicles that can communicate with each other. Note that FIG. 1 illustrates vehicles 2A and 2B among a plurality of vehicles. Hereinafter, a plurality of vehicles may be collectively referred to as a vehicle 2 unless otherwise required to be distinguished.

Figure 2:
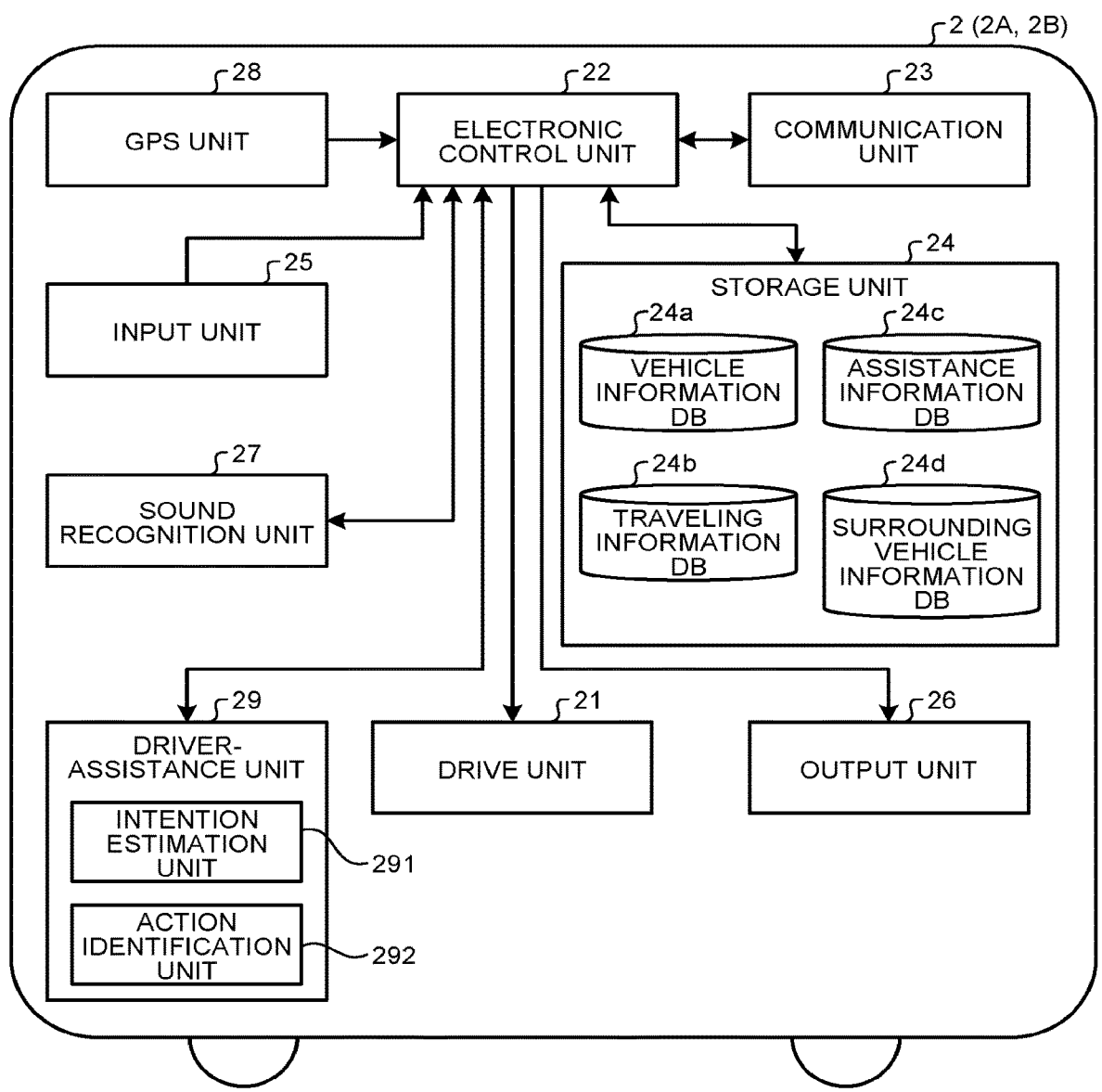
FIG. 2 is a block diagram schematically illustrating a configuration of a vehicle of the driver-assistance system according to the embodiment of the present disclosure.

FIG. 2 is a block diagram schematically illustrating a configuration of the vehicle 2. As illustrated in FIG. 2, the vehicle 2 includes a drive unit 21, an electronic control unit 22, a communication unit 23, a storage unit 24, an input unit 25, an output unit 26, a voice recognition unit 27, a global positioning system (GPS) unit 28, and a driver-assistance unit 29.

The drive unit 21 is a related-art drive unit necessary for traveling of the vehicle 2. Specifically, the vehicle 2 includes an engine serving as a drive source, the engine generates power by using a motor or the like according to driving due to combustion of fuel, and the generated power is charged in a chargeable battery. The vehicle 2 further includes a drive transmission mechanism that transmits a driving force of the engine, drive wheels for traveling, and the like.

The electronic control unit 22 integrally controls the operations of various components mounted to the vehicle 2. The electronic control unit 22 specifically includes a processor such as a central processing unit (CPU), a digital signal processor (DSP), or a field-programmable gate array (FPGA), and a main storage unit such as a random access memory (RAM) or a read only memory (ROM). The electronic control unit 22 loads a program stored in the storage unit 24 into a work area, executes the program, and controls each component and the like through the execution of the program.

The communication unit 23 performs inter-vehicle communication between the vehicle 2A and the vehicle 2B, for example.

The storage unit 24 includes a vehicle information database 24a, a traveling information database 24b, an assistance information database 24c, and a surrounding vehicle information database 24d. In the vehicle information database 24a, various types of information relating to a state of the vehicle 2, such as a battery charge amount, a remaining amount of fuel, or a current position, for example, are stored so as to be updateable. In the traveling information database 24b, various types of traveling information relating to traveling of the vehicle 2 including traveling history information of the vehicle 2 and various types of traveling information transmitted from an external server, such as road congestion status and regulation information, are stored so as to be updateable. In the assistance information database 24c, information related to the driver's intention and information related to an action to be taken according to the intention information are associated with each other and stored so as to be extractable. In the surrounding vehicle information database 24d, information related to the availability of communication with other vehicles located around the own vehicle are stored so as to be updateable.

The storage unit 24 is physically configured by a storage medium selected from a volatile memory such as a RAM, a non-volatile memory such as a ROM, an erasable programmable ROM (EPROM), a hard disk drive (HDD), a removable medium and the like. The storage unit 24 is configured by a storage medium selected from the hard disk drive (HDD), the removable medium and the like. The removable medium is, for example, a universal serial bus (USB) memory, or a disc recording medium such as a compact disc (CD), a digital versatile disc (DVD), or a Blu-ray (registered trademark) disc (BD). Alternatively, the storage unit 24 may be configured by using a computer readable recording medium such as a memory card that can be externally mounted. The storage unit 24 is capable of storing an operating system (OS), various programs, various tables, various databases, and the like for executing an operation of driver-assistance processing. The various programs also include a model update processing program according to the present embodiment. These various programs can also be distributed widely by being recorded in a computer readable recording medium such as a hard disk, flash memory, CD-ROM, DVD-ROM, or flexible disk.

The input unit 25 includes a plurality of input operation units such as a touch panel, a microphone, a button, and a toggle. The input unit 25 is configured to be able to input predetermined information to the electronic control unit 22 by a user or the like operating the operation button or the toggle serving as the input operation unit or emitting voice toward the microphone.

The output unit 26 is configured by using a light emitting member such as a display, a speaker, and a Light Emitting Diode (LED). The output unit 26 is configured to be able to report predetermined information to the outside by displaying characters, figures, or the like on a screen of the display, outputting voice from the microphone, or emitting light according to the control of the electronic control unit 22. Examples of the display include a car navigation system display provided with a touch panel, a head-up display fixedly provided on a dashboard and the like.

The voice recognition unit 27 generates voice data from voice input via the microphone of the input unit 25 and outputs the voice data to the electronic control unit 22. When the voice data is input, the electronic control unit 22 outputs this voice data to the driver-assistance unit 29. The voice recognition unit 27 is configured by using a processor such as a CPU, a DSP, or an FPGA.

The voice recognition unit 27 may convert the voice into the above-mentioned word string.

The GPS unit 28 receives radio waves from the GPS satellites and detects the position of the vehicle 2. The detected position of the vehicle 2 is stored in the vehicle information database 24a so as to be searchable as position information in vehicle information. Note that, as a method for detecting the position of the vehicle 2, a method obtained by combining light detection and ranging or laser imaging detection and ranging (LiDAR) with a three-dimensional digital map may be employed.

The driver-assistance unit 29 includes an intention estimation unit 291 and an action identification unit 292. The driver-assistance unit 29 is configured by using a processor such as a CPU, a DSP, or an FPGA.

Upon receiving the voice data from the voice recognition unit 27, the intention estimation unit 291 executes identification processing on input words. The intention estimation unit 291 converts the received voice data into the word string. The intention estimation unit 291 collates the phonemes (for example, "A" and "I") registered in the storage unit 24 in advance with the received voice data to convert each phoneme included in the voice data into characters. Then, the intention estimation unit 291 collates the set of characters with words registered in the storage unit 24 in advance to perform processing of converting the set of converted characters into the word string. Further, the intention estimation unit 291 applies grammar registered in advance to the word string to distinguish words such as particles included in the word string from words to be used as search keywords. The intention estimation unit 291 estimates the driver's intention such as "turn right" or "change lane" based on the word string. The intention estimation unit 291 outputs the estimated intention information to the electronic control unit 22.

Here, the contents of the words and grammar stored in the storage unit 24 can be updated using an external database, and the updated contents are also reflected in the storage unit 24. For example, when new identification information is added to the database, the added information is added to the storage unit 24 as a new word.

The action identification unit 292 identifies the action to be taken by the driver of the vehicle 2 based on the intention information of each vehicle 2 transmitted and received between the vehicles. The action identification unit 292 refers to the intention information and information related to the action stored in advance in the assistance information database 24c, extracts surrounding road conditions from the traveling information database 24b and vehicle position information from the surrounding vehicle information database 24d, to thereby specify action information.

Next, the building of the surrounding vehicle information stored in the surrounding vehicle information database 24d will be described with reference to FIGS. 3 and 4. FIG. 3 is a diagram illustrating a flow of building the surrounding vehicle information in the driver-assistance system according to the embodiment of the present disclosure.

In step S101, the electronic control unit 22 broadcasts the information on the own vehicle. At this time, the electronic control unit 22 transmits the position, speed, and characteristics (vehicle type, color, and shape) of the own vehicle. By this broadcast, other communicable vehicles acquire information on their own vehicles.

In step S102, the electronic control unit 22 acquires information on the other vehicle from the other vehicle. At this time, the electronic control unit 22 receives the position, speed, and characteristics (vehicle type, color, and shape) of the other vehicle.

Note that step S102 may be executed first, or steps S101 and S102 may be executed simultaneously.

In step S103, when the electronic control unit 22 acquires information from other communicable vehicles located at the periphery, the electronic control unit 22 builds a database of vehicles existing at the periphery and updates the information in the surrounding vehicle information database 24d. At this time, the electronic control unit 22 determines that the vehicle is an incommunicable vehicle when the information is not transmitted within a predetermined time or when a response signal to a signal for determining the communication availability cannot be acquired.

In step S104, the electronic control unit 22 causes the display of the vehicle to display the information such that communicable vehicles and incommunicable vehicles are distinguishable based on the updated database of vehicles existing at the periphery.

FIG. 4 is a diagram illustrating an example of a display screen displayed in the vehicle of the driver-assistance system according to the embodiment of the present disclosure. The assistance image $W_0$ illustrated in FIG. 4 is displayed on the display of the vehicle. Vehicles existing in a preset range are displayed on the assistance image $W_0$. Among them, communicable vehicles (vehicles 100A) is highlighted. Meanwhile, an incommunicable vehicle (vehicle 100B) is not highlighted. It is desired that the communicable vehicles are visually more prominent than the incommunicable vehicle on the display. For example, the incommunicable vehicle may be displayed in a lighter color.

Figure 5:
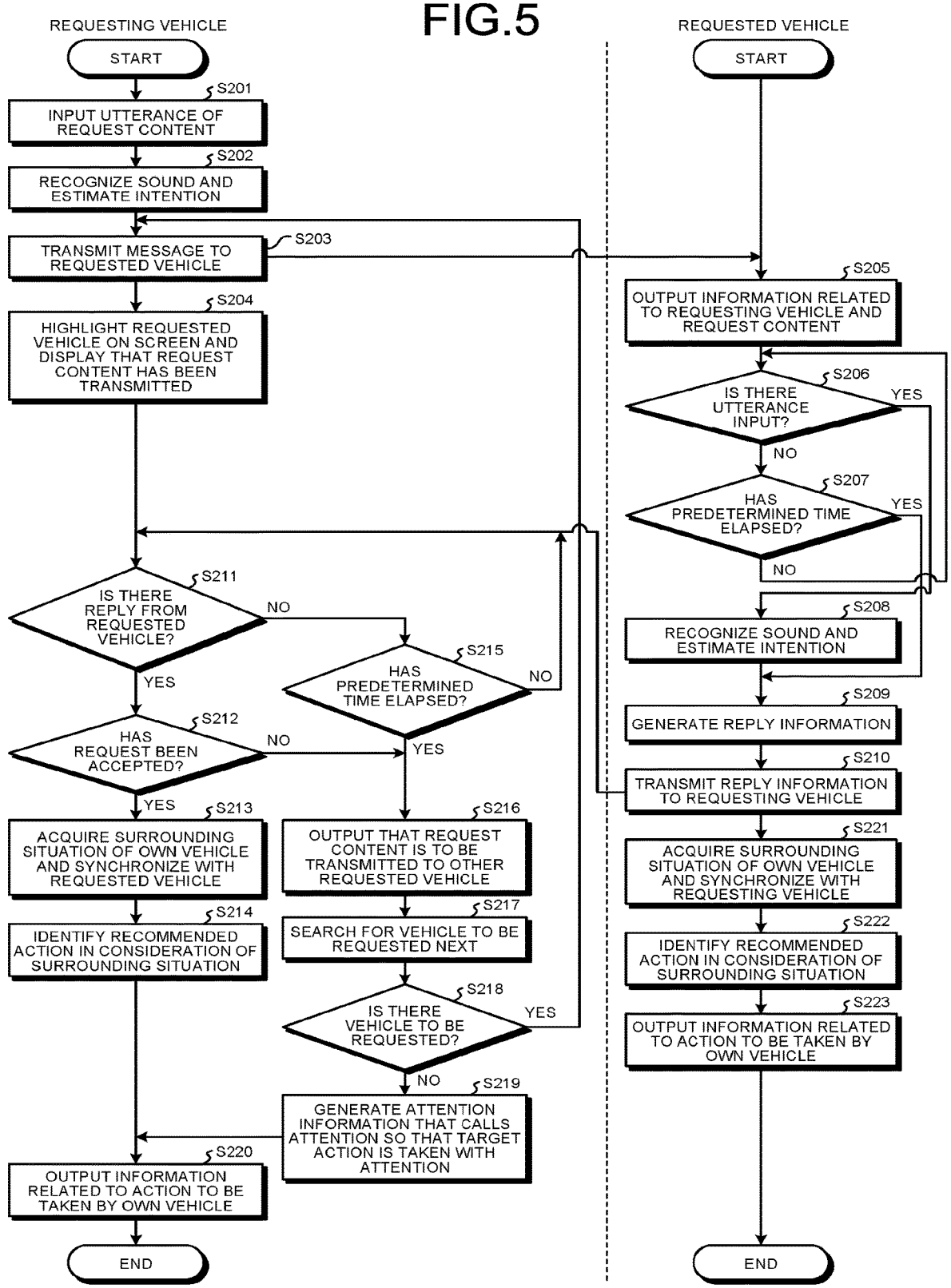
FIG. 5 is a diagram illustrating a flow of driver-assistance processing in the driver-assistance system according to the embodiment of the present disclosure.

Next, the flow of driver-assistance processing executed in the driver-assistance system 1 will be described with reference to FIG. 5. FIG. 5 is a diagram illustrating the flow of the driver-assistance processing in the driver-assistance system 1. In the processing illustrated in FIG. 5, the case where the driver inputs voice regarding driving is taken as an example. In the case of voice input of a content other than the content related to driving, another program is executed. For example, the driver refers to the assistance image $W_0$ illustrated in FIG. 4, determines whether the surrounding vehicles can communicate, and utters the request content. The driver's utterance may be used as a trigger for the driver-assistance processing, or pressing of a button or the like provided around the driver's seat may be used as a trigger for the driver-assistance processing.

In step S201, when the driver inputs utterance, the electronic control unit 22 starts the driver-assistance processing. Hereinafter, a vehicle that sends request is referred to as a requesting vehicle, and a vehicle that receives the request is referred to as a requested vehicle. The voice recognition unit 27 of the requesting vehicle generates voice data from the input voice and outputs the voice data to the electronic control unit 22. The electronic control unit 22 of the requesting vehicle outputs the voice data to the driver-assistance unit 29.

In step S202, the intention estimation unit 291 estimates the intention in the driver's utterance using the voice data. The intention estimation unit 291 outputs the estimated and generated intention information to the electronic control unit 22.

In step S203, the electronic control unit 22 of the requesting vehicle transmits the intention information acquired from the intention estimation unit 291 to the requested vehicle. Further, the electronic control unit 22 highlights the requested vehicle displayed on the screen and displays that the request content has been transmitted (step S204). At this time, the electronic control unit 22 searches for the vehicle to be requested based on the position information acquired from each vehicle, and selects the vehicle traveling at the corresponding position as the requested vehicle. Here, the vehicle to be requested is, for example, a vehicle that is predicted to travel on a route that intersects a travel route that corresponds to the request content.

Figure 6:
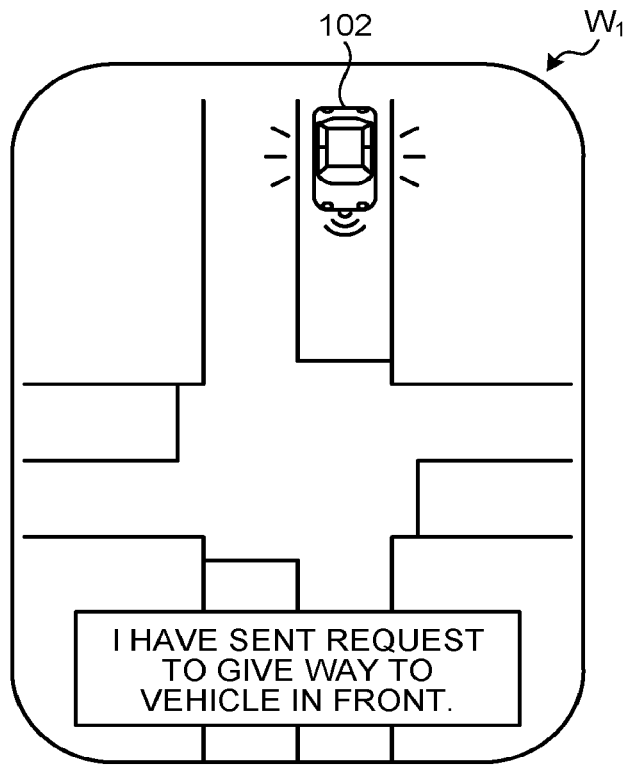
FIG. 6 is diagram illustrating an example of a display screen displayed in the vehicle on a transmitting side during the driver-assistance processing according to the embodiment of the present disclosure.

FIG. 6 is a diagram illustrating an example of a display screen displayed in the vehicle on the transmitting side during the driver-assistance processing according to the embodiment of the present disclosure. The assistance image $W_1$ illustrated in FIG. 6 is displayed on the display of the requesting vehicle. The assistance image $W_1$ corresponds to a view seen from directly above, a requested vehicle 102 is highlighted, and information indicating that the request content has been transmitted is drawn. FIG. 6 illustrates a case where the requesting vehicle sends request to give way because the requesting vehicle wants to turn right to the requested vehicle that is traveling in the oncoming lane In step S205, when receiving the intention information from the requesting vehicle, the requested vehicle outputs information related to the requesting vehicle and the request content. At this time, an image is displayed on the display, or it is notified that request has been received by voice.

Figure 7:
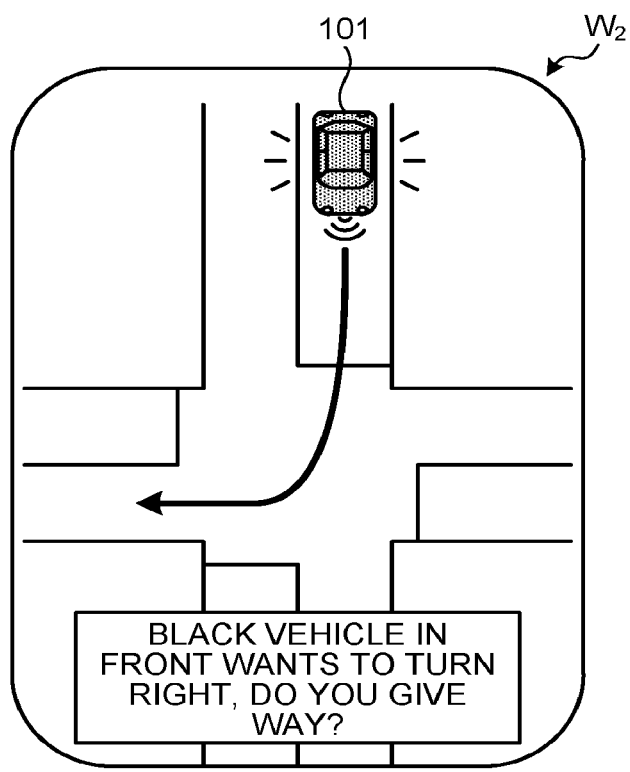
FIG. 7 is diagram illustrating an example of a display screen displayed in the vehicle on a receiving side during the driver-assistance processing according to the embodiment of the present disclosure.

FIG. 7 is a diagram illustrating an example of a display screen displayed in the vehicle on the receiving side during the driver-assistance processing according to the embodiment of the present disclosure. The assistance image $W_2$ illustrated in FIG. 7 is displayed on the display of the requested vehicle. The assistance image $W_2$ corresponds to a view seen from directly above, a requesting vehicle 101 is highlighted, and the characteristics of the requesting vehicle and the request content are drawn. The assistance image $W_2$ displays that request to turn right has been received from the requesting vehicle.

In step S206, the electronic control unit 22 of the requested vehicle determines whether there is an utterance input. When the electronic control unit 22 determines that the driver inputs utterance (step S206: Yes), the electronic control unit 22 proceeds to step S208. On the other hand, when the electronic control unit 22 determines that there is no utterance input from the driver (step S206: No), the electronic control unit 22 proceeds to step S207.

In step S207, the electronic control unit 22 of the requested vehicle determines whether a preset time (predetermined time) has elapsed after the request content is output. When the electronic control unit 22 determines that the preset time has elapsed (step S207: Yes), the electronic control unit 22 proceeds to step S209. On the other hand, when the electronic control unit 22 determines that the preset time has not elapsed (step S207: No), the electronic control unit 22 returns to step S206.

In step S208, the voice recognition unit 27 of the requested vehicle generates voice data from the input voice and outputs the voice data to the electronic control unit 22. The intention estimation unit 291 estimates the intention in the driver's utterance using the voice data. The intention estimation unit 291 outputs the estimated and generated intention information to the electronic control unit 22.

In step S209, the electronic control unit 22 of the requested vehicle generates information related to a reply content. At this time, when the intention estimation unit 291 estimates that the request is accepted, the electronic control unit 22 generates the content that the request is accepted as reply information. On the other hand, when the intention estimation unit 291 estimates that the request is not accepted, the electronic control unit 22 generates the content that the request is not accepted as reply information. In addition, when there is no utterance input for the request, the electronic control unit 22 generates the content that there is no answer as the reply information.

In step S210, the electronic control unit 22 of the requested vehicle transmits the generated reply information to the requesting vehicle.

Meanwhile, the requesting vehicle confirms whether the reply information is received from the requested vehicle (step S211). When the electronic control unit 22 of the requesting vehicle determines that the reply information has been received from the requested vehicle (step S211: Yes), the electronic control unit 22 proceeds to step S212. On the other hand, when the electronic control unit 22 of the requesting vehicle determines that the reply information has not been received from the requested vehicle (step S211: No), the electronic control unit 22 proceeds to step S215.

In step S212, the electronic control unit 22 of the requesting vehicle determines whether the request has been accepted based on the reply information. Here, when the electronic control unit 22 determines that the request has been accepted based on the reply information (step S212: Yes), the electronic control unit 22 proceeds to step S213. On the other hand, when the electronic control unit 22 determines that the request has not been accepted or there is no response (step S212: No), the electronic control unit 22 proceeds to step S216.

In step S213, the action identification unit 292 of the requesting vehicle acquires the surrounding situation of the own vehicle and synchronizes with the requested vehicle. After that, the action identification unit 292 identifies the action (recommended action) that to be taken by the driver of the requesting vehicle based on the request content, the reply content, the surrounding road conditions, and the distance between the requesting vehicle and the requested vehicle (step S214). After identifying the recommended action, the electronic control unit 22 proceeds to step S220.

Further, in step S215, the electronic control unit 22 of the requesting vehicle determines whether a preset time (predetermined time) has elapsed after the request content is transmitted. The predetermined time in step S215 is set longer than the predetermined time set in step S207, for example. When the electronic control unit 22 determines that the preset time has elapsed (step S215: Yes), the electronic control unit 22 proceeds to step S216. On the other hand, when the electronic control unit 22 determines that the preset time has not elapsed (step S215: No), the electronic control unit 22 returns to step S211.

In step S216, the electronic control unit 22 of the requesting vehicle outputs that the request content is to be transmitted to another vehicle because there is no reply from the requested vehicle. At this time, the electronic control unit 22 may display that on the display or may report that by voice.

After that, the electronic control unit 22 searches for a vehicle to be requested next (step S217). The electronic control unit 22 searches for a vehicle to which the request is to be transmitted based on the information on the surrounding situation, and determines whether there is a vehicle to which the request is to be transmitted (step S218). When the electronic control unit 22 determines that there is a vehicle to be requested (step S218: Yes), the electronic control unit 22 returns to step S203, changes the vehicle to be transmitted, and executes the above-described request processing. On the other hand, when the electronic control unit 22 determines that there is no vehicle to be requested (step S218: No), the electronic control unit 22 proceeds to step S219.

In step S219, the electronic control unit 22 of the requesting vehicle generates attention information that calls attention so that the target action is taken with attention because there is no vehicle to be requested.

In step S220, the electronic control unit 22 generates and outputs the information (assistance information) so that the recommended action identified by the action identification unit 292 is executed. At this time, the electronic control unit 22 of the requesting vehicle displays the assistance image corresponding to the recommended action or outputs the content of the recommended action by voice.

Here, in step S220, the electronic control unit 22 of the requesting vehicle may repeat the processes of steps S213, S214, and S220 and execute the driver-assistance processing while synchronizing with the requested vehicle, until the requesting vehicle actually executes the action as the assistance information.

Meanwhile, in the requested vehicle, after transmitting the reply information in step S210, the action identification unit 292 of the requested vehicle acquires the surrounding situation of the own vehicle and synchronizes with the requesting vehicle (step S221). After that, the action identification unit 292 identifies the action (recommended action) to be taken by the driver of the requested vehicle based on the answer status to the request content and the surrounding road conditions (step S222).

In step S223, the electronic control unit 22 of the requested vehicle generates and outputs the information (assistance information) so that the recommended action identified by the action identification unit 292 is executed. At this time, the electronic control unit 22 of the requested vehicle displays the assistance image corresponding to the recommended action or outputs the content of the recommended action by voice.

In step S223, the electronic control unit 22 of the requested vehicle may repeat the processes of steps S221, S222, and S223 and execute the driver-assistance processing while synchronizing with requesting vehicle, until the requested vehicle actually executes the action as the assistance information.

Figure 12:
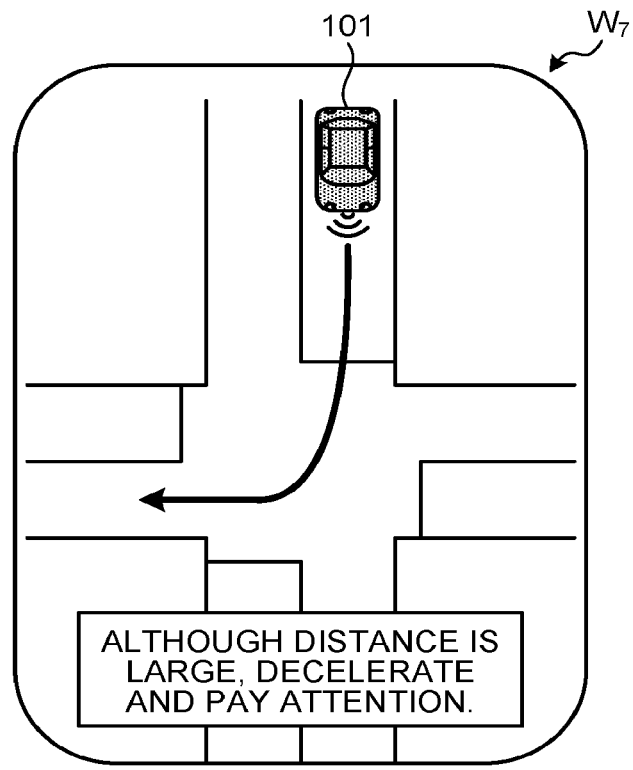
FIG. 12 is diagram illustrating an example of a display screen displayed in the vehicle on the receiving side during the driver-assistance processing according to the embodiment of the present disclosure.
Figure 13:
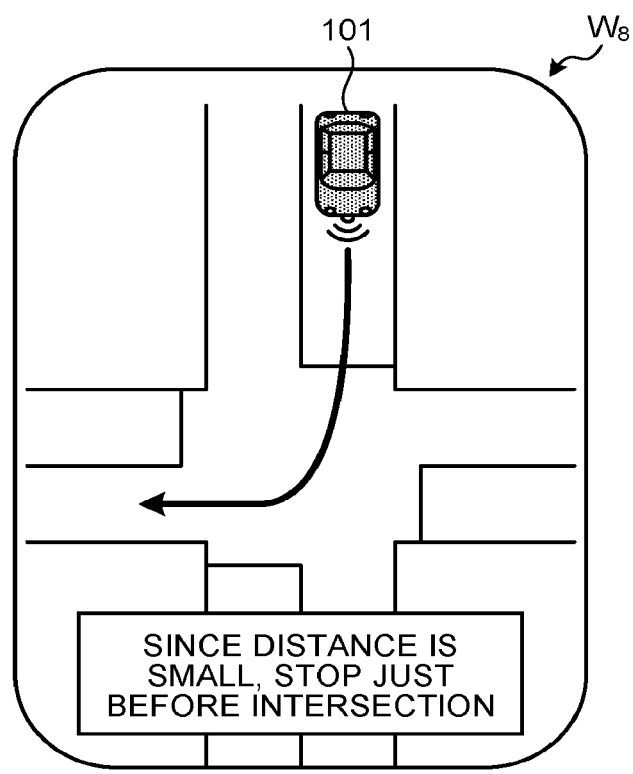
FIG. 13 is diagram illustrating an example of a display screen displayed in the vehicle on the receiving side during the driver-assistance processing according to the embodiment of the present disclosure.
Figure 14:
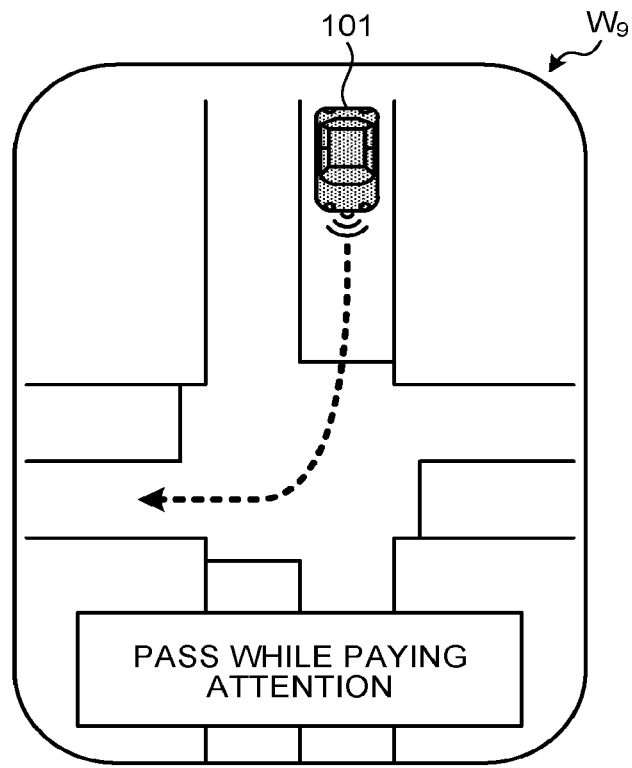
FIG. 14 is diagram illustrating an example of a display screen displayed in the vehicle on the receiving side during the driver-assistance processing according to the embodiment of the present disclosure.

Here, output modes of the recommended actions in the requesting vehicle and the requested vehicle will be described with reference to FIGS. 8 to 14. FIGS. 8 to 11 are diagrams illustrating an example of a display screen displayed in the vehicle on the transmitting side during the driver-assistance processing according to the embodiment of the present disclosure. FIGS. 12 to 14 are diagrams illustrating an example of a display screen displayed in the vehicle on the receiving side during the driver-assistance processing according to the embodiment of the present disclosure.

Display Example 1-1

Figure 8:
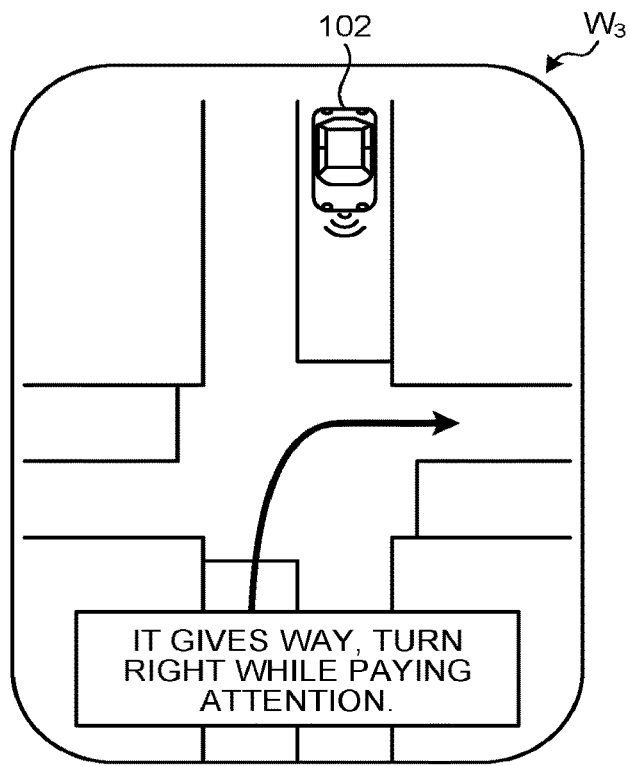
FIG. 8 is diagram illustrating an example of a display screen displayed in the vehicle on the transmitting side during the driver-assistance processing according to the embodiment of the present disclosure.

When the request is accepted from the requested vehicle and the distance between the vehicle (requesting vehicle) and the requested vehicle is sufficiently large, the assistance image $W_3$ illustrated in FIG. 8 is displayed in the requesting vehicle. The assistance image $W_3$ displays that the request has been accepted, the effect of prompting the driver to turn right while paying attention to the safety, and the route therefor.

Display Example 1-2

Figure 9:
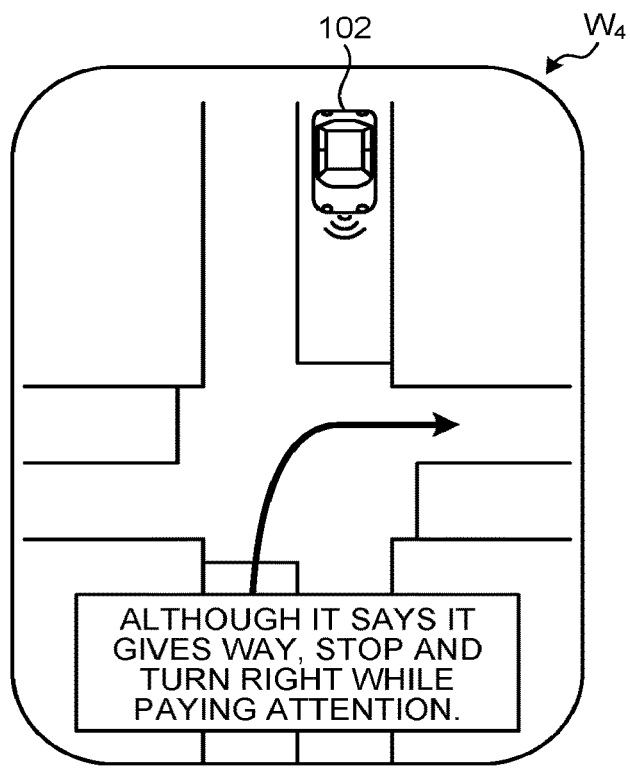
FIG. 9 is diagram illustrating an example of a display screen displayed in the vehicle on the transmitting side during the driver-assistance processing according to the embodiment of the present disclosure.

When the request is accepted from the requested vehicle and the distance between the vehicle (requesting vehicle) and the requested vehicle is small in the right turnable range, the assistance image $W_4$ illustrated in FIG. 9 is displayed in the requesting vehicle. The assistance image $W_4$ displays that the request has been accepted, and the effect of prompting the driver to stop and turn right, and the route therefor.

Display Example 1-3

Figure 10:
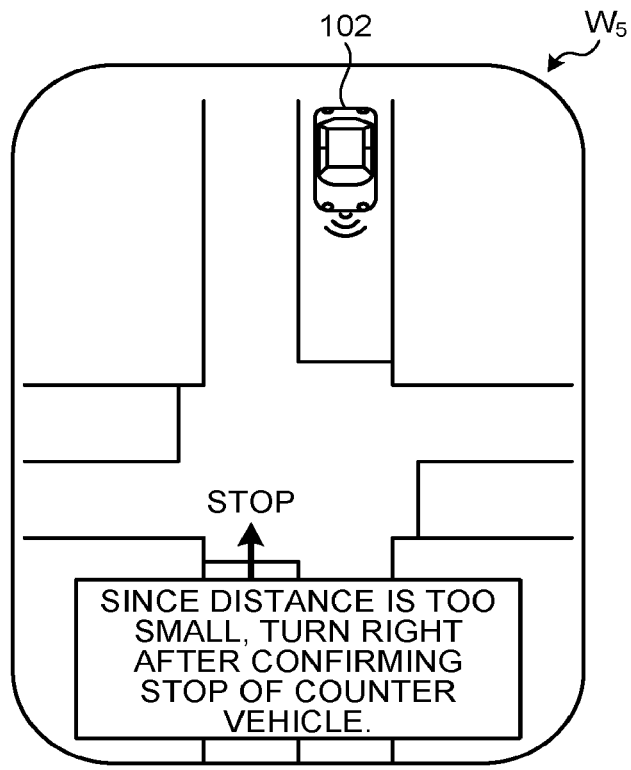
FIG. 10 is diagram illustrating an example of a display screen displayed in the vehicle on the transmitting side during the driver-assistance processing according to the embodiment of the present disclosure.

When the request is accepted from the requested vehicle, the distance between the vehicle (requesting vehicle) and the requested vehicle is small, and the surrounding situation changes after the request is transmitted, with the result that turning right becomes difficult, the assistance image $W_5$ illustrated in FIG. 10 is displayed in the requesting vehicle. The assistance image $W_5$ displays the effect of prompting the driver to stop and turn right after confirming stop of the requested vehicle, and the instruction information to stop first ("stop" in FIG. 10).

Display Example 1-4

Figure 11:
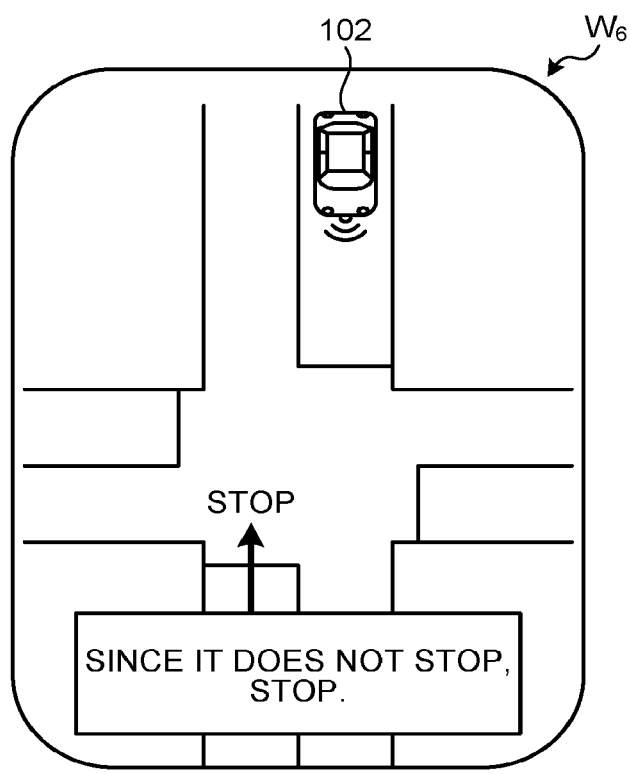
FIG. 11 is diagram illustrating an example of a display screen displayed in the vehicle on the transmitting side during the driver-assistance processing according to the embodiment of the present disclosure.

When the request is not accepted from the requested vehicle, or when the answer to the request is not obtained, the assistance image $W_6$ illustrated in FIG. 11 is displayed in the requesting vehicle. The assistance image $W_6$ displays that the request has not been accepted, the effect of prompting the driver to stop, and the instruction information.

Display Example 2-1

When the requested vehicle accepts the request from the requesting vehicle and the distance between the vehicle (requested vehicle) and the requesting vehicle is sufficiently large, the assistance image $W_7$ illustrated in FIG. 12 is displayed in the requested vehicle. The assistance image $W_7$ displays the effect of prompting deceleration and the route of the requesting vehicle.

Display Example 2-2

When the requested vehicle accepts the request from the requesting vehicle and the distance between the vehicle (requested vehicle) and the requesting vehicle is small in the right turnable range, the assistance image $W_8$ illustrated in FIG. 13 is displayed in the requested vehicle. The assistance image $W_8$ displays the effect of prompting the driver to stop and wait for the right turn of the requesting vehicle, and the route of the requesting vehicle.

Display Example 2-3

When the requested vehicle does not accept the request from the requesting vehicle, or does not answer to the request, the assistance image $W_9$ illustrated in FIG. 14 is displayed in the requested vehicle. The assistance image $W_9$ displays the effect of prompting the driver to travel while paying attention to the safety and the route (indicated by the broken line in FIG. 12) corresponding to the request content of the requesting vehicle.

Figure 15:
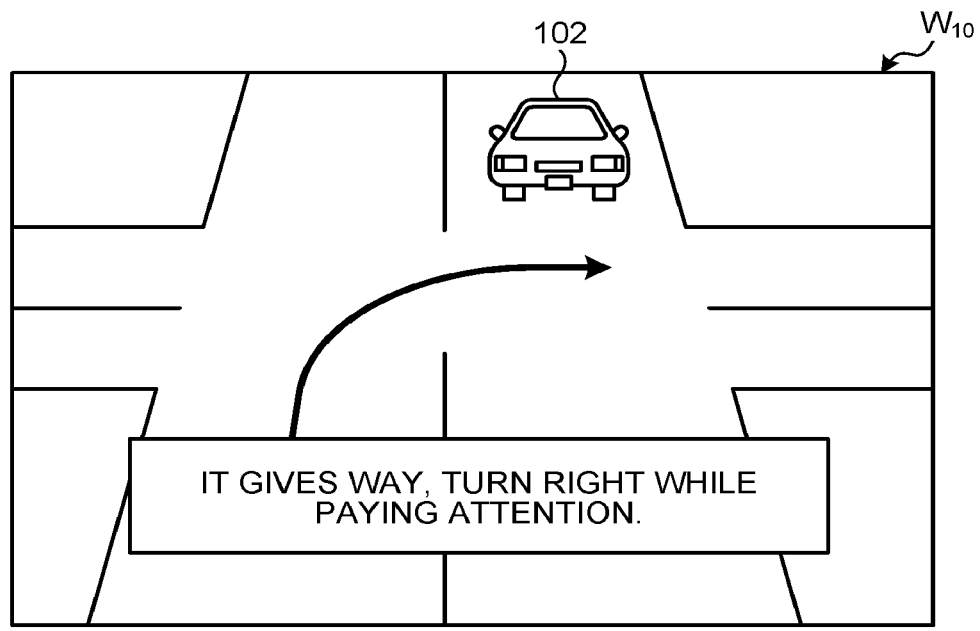
FIG. 15 is diagram illustrating an example of a display screen displayed in the vehicle on the transmitting side during the driver-assistance processing according to the embodiment of the present disclosure.
Figure 16:
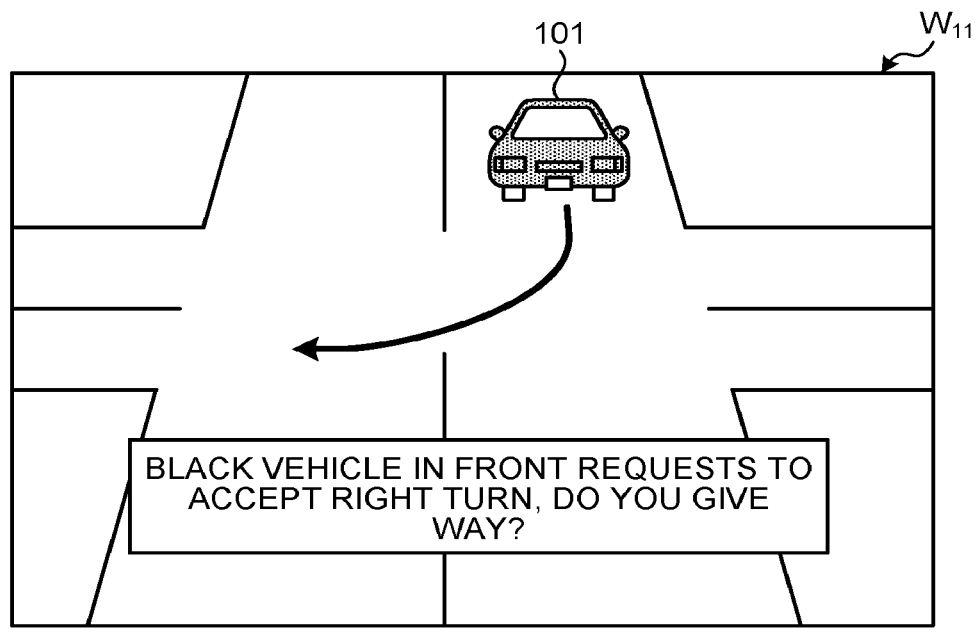
FIG. 16 is diagram illustrating an example of a display screen displayed in the vehicle on the receiving side during the driver-assistance processing according to the embodiment of the present disclosure.
Figure 17:
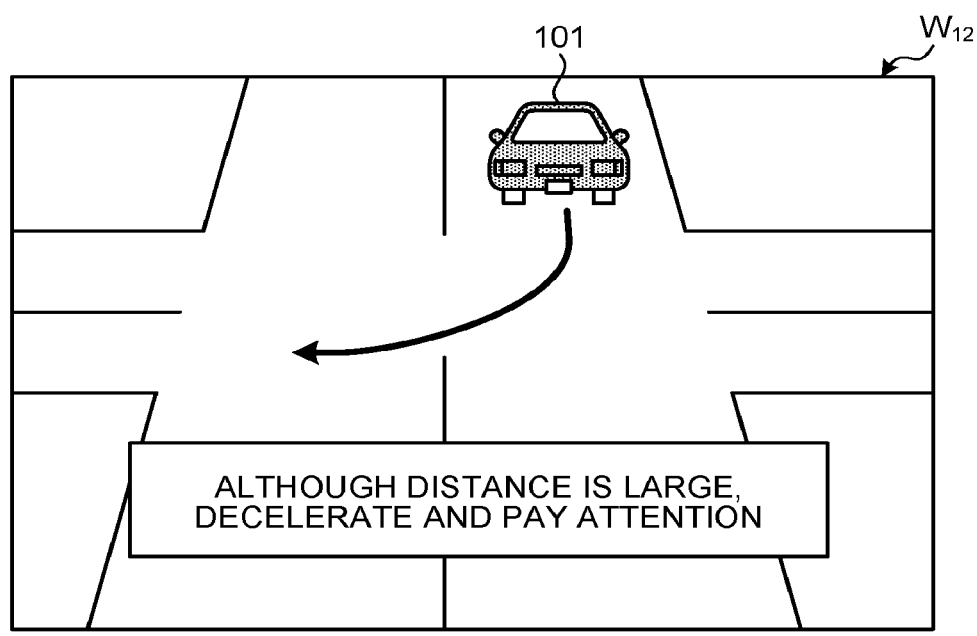
FIG. 17 is diagram illustrating an example of a display screen displayed in the vehicle on the receiving side during the driver-assistance processing according to the embodiment of the present disclosure.

In FIGS. 8 to 14, description is made with reference to the assistance images viewed from directly above as an example, but the line-of-sight direction is not limited to this. For example, the image may be a bird's-eye view or an image according to the line of sight of the driver. FIGS. 15 to 17 are diagrams illustrating another example of the display screen displayed on the vehicle on the transmitting side during the driver-assistance processing, and are diagrams illustrating an example of the assistance image viewed from a bird's eye view.

Display Example 3-1

When the request is accepted from the requested vehicle and the distance between the vehicle (requesting vehicle) and the requested vehicle is sufficiently large (corresponding to the display example 1-1), the assistance image $W_{10}$ illustrated in FIG. 15 is displayed in the requesting vehicle. The assistance image $W_{10}$ displays that the request has been accepted, the effect of prompting the driver to turn right while paying attention to the safety, and the route therefor in a bird's eye view.

Display Example 3-2

When the requested vehicle receives the request from the requesting vehicle, the assistance image $W_{11}$ illustrated in FIG. 16 is displayed in the requested vehicle. The assistance image $W_{11}$ displays that a request to accept right turn has been received from the requesting vehicle in a bird's eye view.

Display Example 3-3

When the requested vehicle accepts the request from the requesting vehicle and the distance between the vehicle (requested vehicle) and the requesting vehicle is sufficiently large (corresponding to the display example 2-1), the assistance image $W_{12}$ illustrated in FIG. 17 is displayed in the requested vehicle. The assistance image $W_{12}$ displays the effect of prompting deceleration and the route of the requesting vehicle in a bird's-eye view.

In the embodiment described above, the request transmitting side and the request receiving side communicate with each other, and the action to be taken in each vehicle according to the answer to the request is recommended. The driver can realize smooth and safe driving by driving according to the recommended action. According to the present embodiment, it is possible to appropriately assist the actions to be taken by the drivers on both the transmitting side and the receiving side by outputting the recommended actions corresponding to the request and the answer.

First Modification

Next, a first modification of the above-described embodiment will be described with reference to FIGS. 18 and 19. The configuration of the driver-assistance system according to the first modification is the same as the configuration of the driver-assistance system 1 described above, and thus the description thereof is omitted. In the embodiment, the processing in one requesting vehicle and one requested vehicle is described, but in the first modification, processing in one requesting vehicle and a plurality of requested vehicles will be described.

Figure 18:
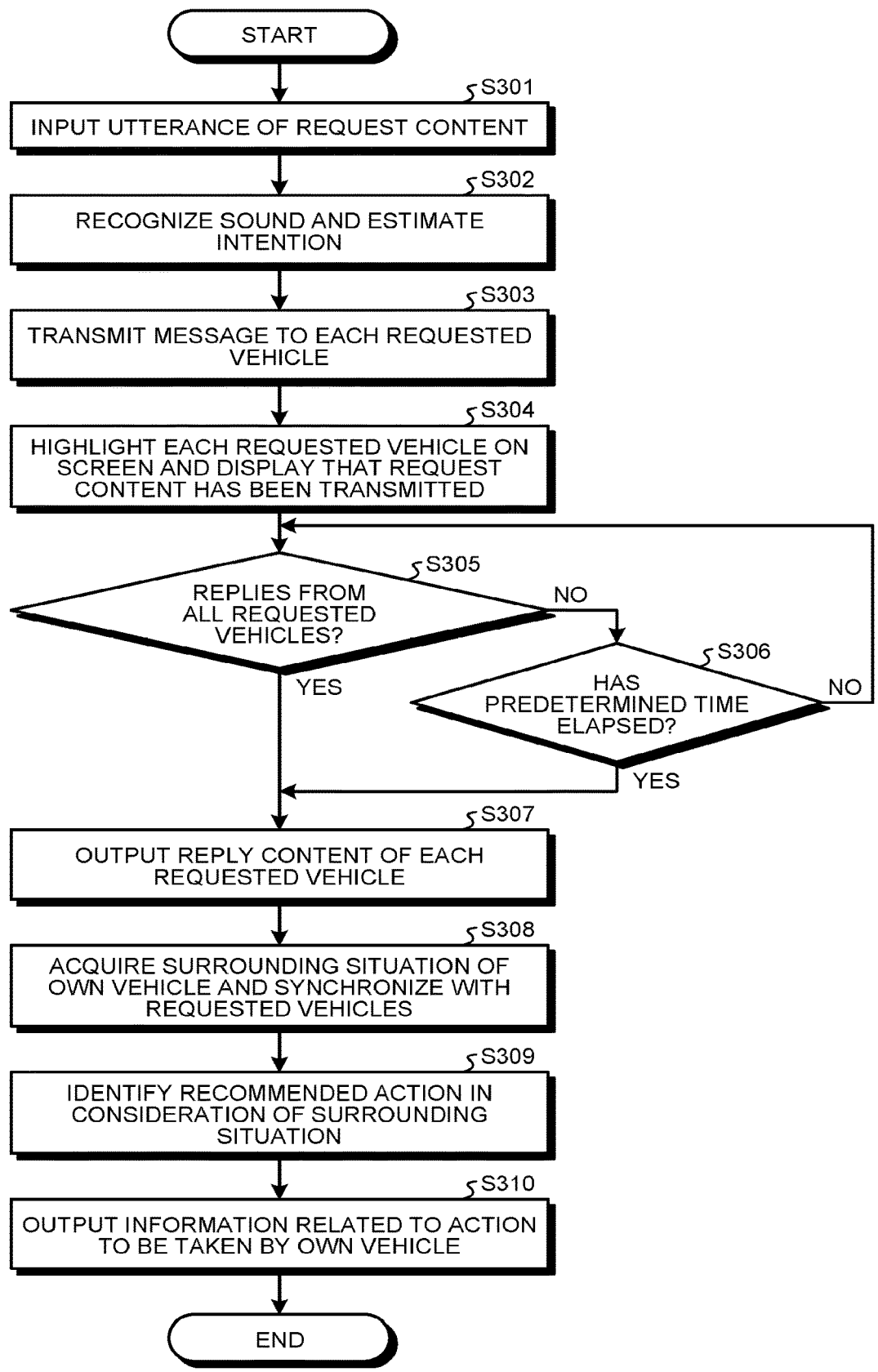
FIG. 18 is a diagram illustrating a flow of driver-assistance processing in the driver-assistance system according to a first modification of the embodiment of the present disclosure.
Figure 19:
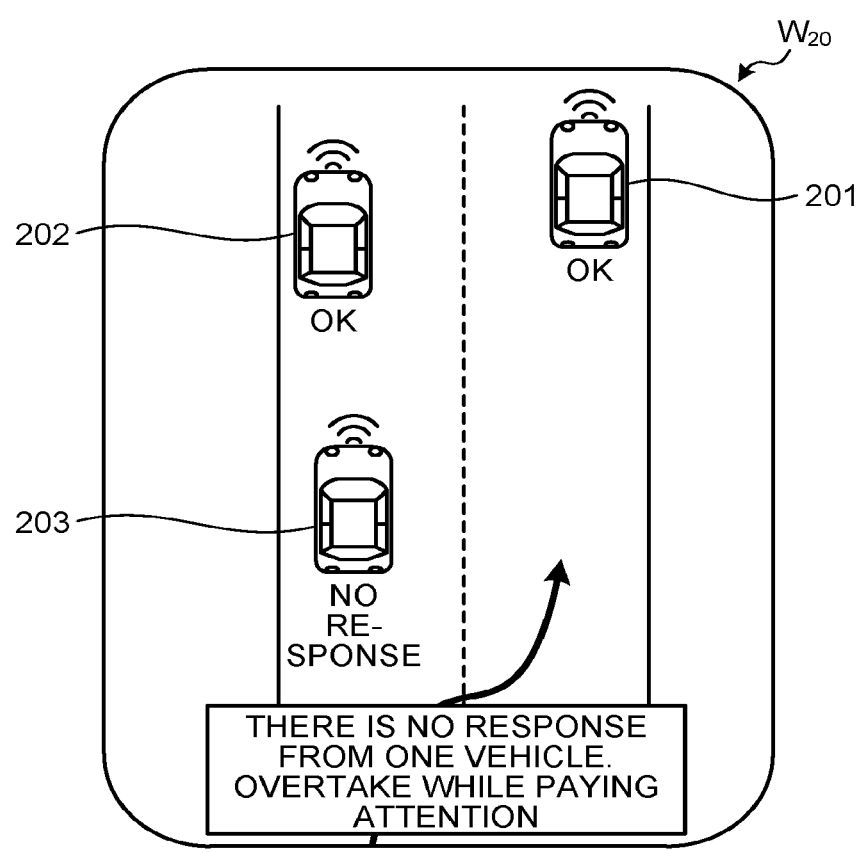
FIG. 19 is diagram illustrating an example of a display screen displayed in the vehicle on the transmitting side during the driver-assistance processing according to the first modification of the present disclosure.

FIG. 18 is a diagram illustrating a flow of the driver-assistance processing according to the first modification. In the processing illustrated in FIG. 18, the case where the driver inputs voice regarding driving is taken as an example. In the case of voice input of a content other than the content related to driving, another program is executed.

The electronic control unit 22 executes the same processing as steps S201 and S202 described above (steps S301 and S302).

In step S303, the electronic control unit 22 of the requesting vehicle transmits the intention information acquired from the intention estimation unit 291 to the plurality of requested vehicles. At this time, the electronic control unit 22 searches for the vehicle to be requested based on the position information acquired from each vehicle, and selects the vehicle traveling at the corresponding position as the requested vehicle.

Further, the electronic control unit 22 highlights the requested vehicles displayed on the screen and displays that the request content has been transmitted (step S304). At this time, a vehicle that does not include the communication unit 23 may be highlighted in another pattern.

In each requested vehicle, information related to the requesting vehicle and the request content is output, and reply information is generated according to the content of the answer and transmitted to the requesting vehicle (see steps S205 to S210).

Meanwhile, the requesting vehicle confirms whether the reply information is received from all the requested vehicles (step S305). When the electronic control unit 22 of the requesting vehicle determines that the reply information has been received from each requested vehicle (step S305: Yes), the electronic control unit 22 proceeds to step S307. On the other hand, when the electronic control unit 22 of the requesting vehicle determines that the reply information has not been received from each requested vehicle (step S305: No), the electronic control unit 22 proceeds to step S306.

In step S306, the electronic control unit 22 of the requesting vehicle determines whether a preset time (predetermined time) has elapsed after the request content is transmitted. The predetermined time in step S306 is set to the same degree as the predetermined time set in step S215, for example. When the electronic control unit 22 determines that the preset time has elapsed (step S306: Yes), the electronic control unit 22 proceeds to step S307. On the other hand, when the electronic control unit 22 determines that the preset time has not elapsed (step S306: No), the electronic control unit 22 returns to step S305.

In step S307, the electronic control unit 22 of the requesting vehicle outputs the reply status from each requested vehicle. FIG. 19 is a diagram illustrating an example of a display screen displayed in the vehicle on the transmitting side during the driver-assistance processing according to the modification. For example, in the assistance image $W_{20}$ illustrated in FIG. 19, reply contents ("OK", "No", or "No reply") are displayed near each requested vehicle on the display screen.

In step S308, the action identification unit 292 of the requesting vehicle acquires the surrounding situation of the own vehicle and synchronizes with the requested vehicles. After that, the action identification unit 292 identifies the action (recommended action) that to be taken by the driver of the requesting vehicle based on the request content and the reply content (step S309). After identifying the recommended action, the electronic control unit 22 proceeds to step S310.

In step S310, the electronic control unit 22 of the requesting vehicle outputs the information (assistance information) so that the recommended action identified by the action identification unit 292 is executed. For example, in the assistance image $W_{20}$ illustrated in FIG. 19, information of prompting overtaking is displayed based on the reply from each requested vehicle. FIG. 19 illustrates a case where, out of the three requested vehicles, there is a reply from two requested vehicles, but no response from one vehicle.

Meanwhile, in each requested vehicle, after the reply information to the requesting vehicle is transmitted, the action identification unit 292 acquires the surrounding situation of the own vehicle, synchronizes with the requesting vehicle, and identifies the action (recommended action) to be taken by the driver of the requested vehicle based on the answer status to the request content. After that, the electronic control unit 22 of the requested vehicle outputs the information (for example, assistance information such as an image) so that the recommended action identified by the action identification unit 292 is executed (see steps S221 to S223).

In the first modification described above, the request transmitting side and the request receiving sides communicate with each other, and the action to be taken in each vehicle according to the answer to the request is recommended. The driver can realize smooth and safe driving by driving according to the recommended action. According to the first modification, it is possible to appropriately assist the actions to be taken by the drivers on both the transmitting side and the receiving sides by outputting the recommended actions corresponding to the request and the answer.

Second Modification

Figure 20:
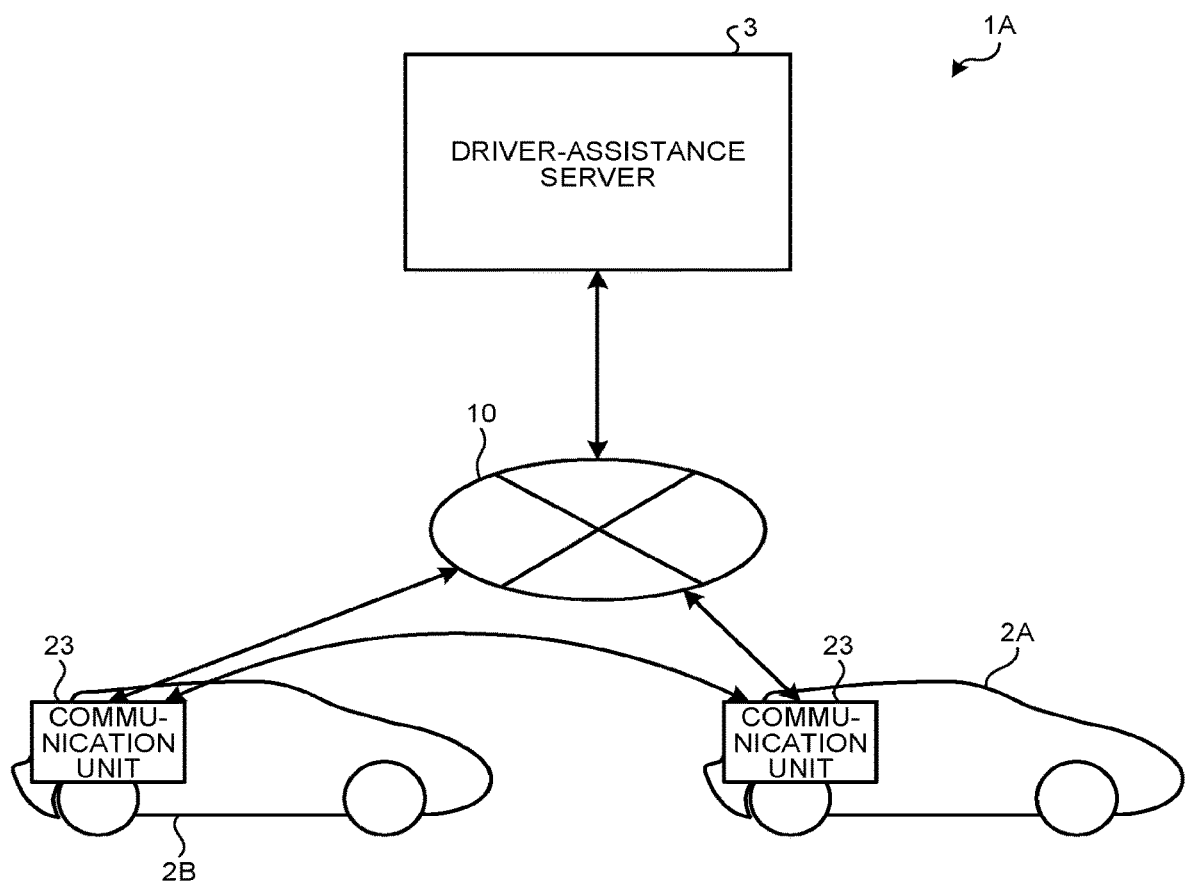
FIG. 20 is a schematic diagram illustrating a driver-assistance system including a driver-assistance device according to a second modification of the present disclosure.

Next, a second modification of the above-described embodiment will be described with reference to FIG. 20. A driver-assistance system 1A according to the second modification includes a driver-assistance server 3 and a plurality of vehicles (vehicles 2A and 2B) that can communicate with each other via a communication network 10.

The communication network 10 is configured by the Internet line network, a mobile phone line network or the like. The communication network 10 is, for example, a public communication network such as the Internet, and is configured by one or more combinations of, for example, a local area network (LAN), a wide area network (WAN), a telephone communication network of a mobile phone or the like or a public line, a virtual private network (VPN), a dedicated line and the like. In the communication network 10, wired communication and wireless communication are appropriately combined.

The driver-assistance server 3 acquires the position information of each vehicle and transmits the information that assists driving to each vehicle. The driver-assistance server 3 includes a processor such as a CPU, a DSP, or an FPGA, and a memory such as a RAM and/or a ROM. In addition, the driver-assistance server 3 stores at least the information in the assistance information database 24c and the surrounding vehicle information database 24d so as to be updatable, and has the function of the driver-assistance unit 29.

The communication unit 23 of the vehicle 2 according to the second modification performs, for example, inter-vehicle communication between the vehicle 2A and the vehicle 2B, or communicates with the driver-assistance server 3, or the communication unit 23 of another vehicle 2 by wireless communication via the communication network 10.

In the second modification, the driver-assistance server 3 executes the driver-assistance processing for each vehicle, in addition to the driver-assistance processing executed by the inter-vehicle communication described in the above-described embodiment. Specifically, the driver-assistance server 3 receives a request from one vehicle and transmits the request to the other vehicle. Then, based on the answer transmitted from the other vehicle, the assistance information for assisting the driving is output to both the vehicles.

In the second modification described above, the driver-assistance server 3 mediates between the request transmitting side and the request receiving side, and this driver-assistance server 3 recommends the action to be performed in each vehicle according to the answer to the request. The driver can realize smooth and safe driving by driving according to the recommended action. According to the second modification, it is possible to appropriately assist the actions to be taken by the drivers on both the transmitting side and the receiving side by outputting the recommended actions corresponding to the request and the answer.

Here, in the second modification, the driver-assistance unit 29 may be provided only in the driver-assistance server 3, and the driver-assistance server 3 may collectively execute the request, the answer, and the driver-assist from each vehicle 2.

In addition, in the embodiment and the first modification, the driver-assistance processing at the time of turning right or changing lanes is described as an example, but the present disclosure is not limited to this, and the driver-assistance processing may be executed in various cases. For example, there are cases of entering the road from outside the road, and cases of assisting travel at an intersection without a traffic light or an intersection at the time of a power failure. In addition, the present disclosure can be applied to a case where an emergency vehicle such as an ambulance is the requesting vehicle so as to secure an emergency passage.

According to the present disclosure, there is giving an effect of being capable of appropriately assisting the actions to be taken by the drivers on both the intention transmitting side and the receiving side.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driver-assistance device comprising:
a processor having hardware,
wherein the processor is configured to:
estimate an intention related to a drive of a vehicle provided with the processor from input voice data;
generate first intention information based on the estimation;
transmit the first intention information to outside; and
generate and output assistance information, which is for assisting the drive of the vehicle provided with the processor based on the first intention information estimated by the processor and second intention information which is an intention related to a drive of another vehicle that receives the first intention information transmitted to the outside, the second intention information being estimated by another processor provided in the other vehicle, and
wherein the processor is configured to generate the assistance information based on the first intention information, the second intention information, and a distance between a vehicle that has transmitted a request and a vehicle that has received the request.

2. The driver-assistance device according to claim 1, wherein the processor is configured to generate and output the assistance information in synchronization with the other processor.

3. The driver-assistance device according to claim 1, wherein the processor is configured to:
transmit request information, which is related to traveling of the vehicle provided with the processor, to the other vehicle as the first intention information; and
generate and output the assistance information in accordance with the request information and reply information as a response to the request, the request information being the second intention information acquired from the other processor.

4. The driver-assistance device according to claim 3,
wherein the request information refers to information, which is for requesting to accept an entry of the vehicle into a route of the other vehicle, and
wherein the assistance information refers to information, which prompts the entry into the route of the other vehicle when reply information, which indicates that the request has been accepted, is acquired from the other processor, and information which prompts the vehicle to decelerate or stop when reply information, which indicates that the request has been rejected, is acquired from the other processor.

5. The driver-assistance device according to claim 1, wherein the processor is configured to:
transmit request information, which is related to traveling of the vehicle provided with the processor, to a plurality of other vehicles as the first intention information; and
generate the assistance information in accordance with the request information and reply information as a response to the request, the reply information being the second intention information acquired from each of other processors.

6. The driver-assistance device according to claim 1, wherein the processor is configured to:
transmit reply information as the first intention information, the reply information being a response to request information related to traveling of the other vehicle, the reply information being the second intention information received from the other vehicle; and
generate the assistance information in accordance with the request information and the reply information.

7. The driver-assistance device according to claim 6,
wherein the request information refers to information for requesting to accept entry of the other vehicle into a route of the vehicle provided with the processor, and
wherein the assistance information refers to information, which prompts an action necessary for the other vehicle to enter the route of the vehicle, when the reply information indicating that the request has been accepted is transmitted, and information, which allows the vehicle to continue traveling on the route of the vehicle, when the reply information indicating that the request has been rejected is transmitted.

8. A driver-assistance system comprising:
a first device including a first processor having hardware; and
a second device including a second processor having hardware,
wherein the first processor is configured to:
estimate an intention, which is related to a drive of a first vehicle provided with the first device, based on input voice data;
transmit request information, which is generated based on the estimated intention, to the second device; and
generate and output first assistance information, which is for assisting a drive of the first vehicle based on the request information and information related to an intention estimated in the second device and acquired from the second device,
wherein the second processor is configured to:
output the request information acquired from the first device;
estimate an intention relative to the request information based on voice data input in response to the request information; and
generate and output second assistance information, which is for assisting drive of a second vehicle provided with the second device, based on the intention estimated in the second device and the request information, and
wherein the first processor and the second processor are configured to generate and output the first assistance information and the second assistance information, respectively, based on the request information, the intention relative to the request information, and a distance between the first vehicle and the second vehicle.

9. The driver-assistance system according to claim 8, wherein the first processor and the second processor are configured to output the first assistance information and the second assistance information, respectively, in synchronization with each other.

10. The driver-assistance system according to claim 8,
wherein the request information refers to information, which is for requesting to accept entry of the first vehicle into a route of the second vehicle, to the second vehicle,
wherein the second processor is configured to transmit reply information based on estimated intention in response to the request of the entry into the route of the second vehicle from the first vehicle, and
wherein the first processor and the second processor are configured to:
generate and output the first assistance information and the second assistance information, respectively, which prompt actions necessary for the first vehicle to enter the route of the second vehicle when the second device transmits reply information, indicating that the request has been accepted, to the first device, and
generate and output the first assistance information and the second assistance information, respectively, which cause the first vehicle to be stopped and allow the second vehicle to continue traveling on the route when the second device transmits reply information, indicating that the request has been rejected, to the first device.

11. A non-transitory computer readable recording medium storing a driver-assistance program for causing a processor having hardware to:
estimate intention related to a drive of a vehicle provided with the processor from input voice data;
transmit first intention information generated by estimation to outside; and
generate and output assistance information, which is for assisting the drive of the vehicle provided with the processor and is based on the first intention information estimated by the processor and second intention information, which refers to intention related to a drive of another vehicle that receives the first intention information transmitted to the outside, the second intention information being estimated by another processor provided in the other vehicle,
wherein the driver-assistance program is configured to cause the processor to generate the assistance information based on the first intention information, the second intention information, and a distance between a vehicle that has transmitted a request and a vehicle that has received the request.

12. The recording medium according to claim 11, wherein the driver-assistance program is configured to cause the processor to generate and output the assistance information in synchronization with the other processor.

13. The recording medium according to claim 11, wherein the driver-assistance program is configured to cause the processor to:
transmit request information, which is related to traveling of a vehicle provided with the processor, to the other vehicle as the first intention information; and generate and output the assistance information in accordance with the request information and reply information in response to the request, the reply information being the second intention information acquired from the other processor.

14. The recording medium according to claim 13,
wherein the request information refers to information for requesting to accept entry of the vehicle into a route of the other vehicle, and
wherein the assistance information refers to information which prompts the entry into the route of the other vehicle when reply information indicating that the request has been accepted is acquired from the other processor, and information which prompts the vehicle to decelerate or stop when reply information indicating that the request has been rejected is acquired from the other processor.

15. The recording medium according to claim 11, wherein the driver-assistance program is configured to cause the processor to:
transmit request information, which is related to traveling of the vehicle provided with the processor, to a plurality of other vehicles as the first intention information; and
generate the assistance information in accordance with the request information and reply information in response to the request, the reply information being the second intention information acquired from each of the other processors.

16. The recording medium according to claim 11, wherein the driver-assistance program is configured to cause the processor to:
transmit reply information in response to request information, which is related to traveling of the other vehicle and is the first intention information received from the other vehicle, as the second intention information; and
generate the assistance information in accordance with the request information and the reply information.

17. The recording medium according to claim 16,
wherein the request information refers to information for requesting to accept entry of the other vehicle into a route of the vehicle provided with the processor, and
wherein the assistance information refers to information which prompts an action necessary for the other vehicle to enter the route of the vehicle when reply information indicating that the request has been accepted is transmitted, and information which allows the vehicle to continue traveling on the route of the vehicle when reply information indicating that the request has been rejected is transmitted.

* * * * *